United States Patent [19]

Utsunomiya et al.

[11] Patent Number: 5,571,629

[45] Date of Patent: *Nov. 5, 1996

[54] OPTICAL RECORDING MEDIUM

[75] Inventors: Hajime Utsunomiya; Hideki Hirata; Kenji Uchiyama; Hideki Ishizaki; Suguru Takayama, all of Nagano, Japan

[73] Assignee: TDK Corporation, Tokyo, Japan

[*] Notice: The term of this patent shall not extend beyond the expiration date of Pat. No. 4,861,656.

[21] Appl. No.: 296,156

[22] Filed: Aug. 29, 1994

Related U.S. Application Data

[63] Continuation of Ser. No. 46,128, Apr. 12, 1993, abandoned, which is a continuation of Ser. No. 763,497, Sep. 23, 1991, abandoned, which is a continuation of Ser. No. 213,936, Jun. 30, 1988, abandoned.

[30] Foreign Application Priority Data

| | | | |
|---|---|---|---|
| Jul. 10, 1987 | [JP] | Japan | 62-172377 |
| Jul. 23, 1987 | [JP] | Japan | 62-184555 |

[51] Int. Cl.$^6$ .................... G11B 11/00; G11B 5/66; G11B 5/70

[52] U.S. Cl. .................... 428/694 DE; 369/13; 369/288; 428/694 RE; 428/694 NF; 428/694 XS; 428/694 T; 428/900

[58] Field of Search .................... 428/694 DE, 694 NF, 428/694 XS, 694 RE, 900, 694 T; 430/945; 361/131–135; 369/13, 288; 204/192.14, 192.15, 192.2, 192.23, 192.26

[56] References Cited

U.S. PATENT DOCUMENTS

| | | | |
|---|---|---|---|
| 4,680,742 | 7/1987 | Yamada et al. | 369/13 |
| 4,695,510 | 9/1987 | Sawamura et al. | 428/336 |
| 4,711,821 | 12/1987 | Kikuchi et al. | 428/457 |
| 4,743,502 | 5/1988 | Yoshitomi | 428/694 DE |
| 4,861,656 | 8/1989 | Uchiyama et al. | 428/333 |
| 4,902,584 | 2/1990 | Uchiyama et al. | 428/694 XS |

FOREIGN PATENT DOCUMENTS

| | | |
|---|---|---|
| 0231672 | 8/1987 | European Pat. Off. . |
| 61-22458 | 1/1986 | Japan . |
| 61-278062 | 12/1986 | Japan . |
| 117156 | 5/1987 | Japan . |
| 289948 | 12/1987 | Japan . |
| 2164269 | 2/1986 | United Kingdom . |

Primary Examiner—Leszek Kiliman
Assistant Examiner—Stephen Sand
Attorney, Agent, or Firm—Oblon, Spivak, McClelland, Maier & Neustadt, P.C.

[57] ABSTRACT

An optical recording medium comprising a recording layer on a substrate and an intermediate layer between the substrate and the recording layer exhibits high reflectance and corrosion resistance when the intermediate layer comprises silicon, aluminum, oxygen, nitrogen, and at least one element selected from the group consisting of yttrium, lanthanide elements and actinide elements, and contains 0.1 to 2 atom % of the element and 20 to 90 atom % of silicon and nitrogen combined or 2 to 35 atom % of the element and 20 to 95 atom % of silicon and nitrogen combined.

6 Claims, 1 Drawing Sheet

FIG. I
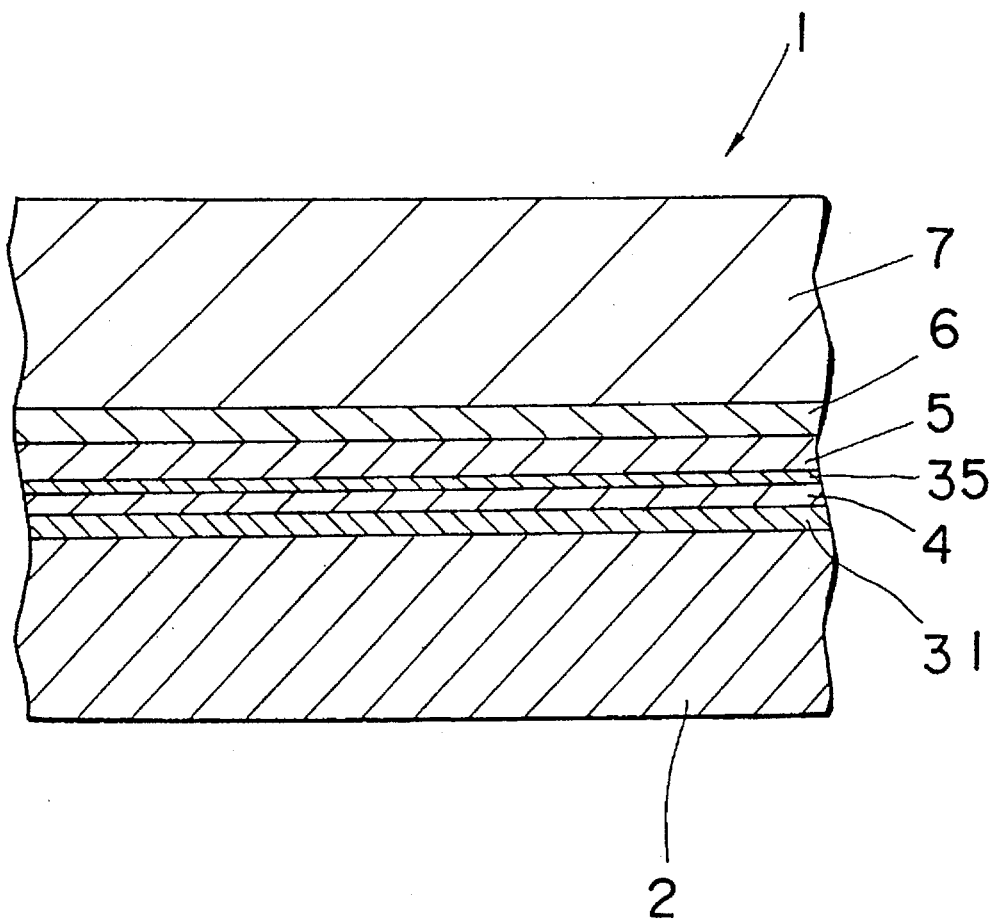

OPTICAL RECORDING MEDIUM

This application is a continuation of Ser. No. 08/046,128 filed Apr. 12, 1993 which is a continuation of Ser. No. 07/763,497 filed Sep. 23, 1991 which is a continuation of Ser. No. 07/213,936 filed Jun. 30, 1988, all abandoned.

BACKGROUND OF THE INVENTION

This invention relates to optical recording medium of the type wherein information is magneto-optically recorded and reproduced with the use of heat and light of a laser beam.

For optical recording media of magneto-optical memory type, there are well known a number of materials for a recording layer thereof, for example, MnBi, MnAlGe, MnSb, MnCuBi, GdFe, TbFe, GdCo, PtCo, TbCo, TbFeCo, GdFeCo, TbFeO$_3$, GdIG (gadolinium iron garnet), GdTbFe, GdTbFeCoBi, CoFe$_2$O$_4$, etc. These materials are deposited on transparent substrates of plastic material or glass as a thin film by any suitable thin-film forming techniques such as vacuum deposition or sputtering. The features common to these magneto-optical recording thin film layers are that the axis of easy magnetization is perpendicular to the film surface and that Kerr and Farady effects are great.

Requirements imposed on such magneto-optic recording media are:

(1) that the Curie point is of the order of 100° to 200° C. and the compensation point is close to room temperature, (2) that noise-inducing defects such as grain boundary are relatively fewer, and (3) that a magnetically and mechanically even film is attained over a relatively large area.

In the light of these requirements, a great attention is recently drawn to amorphous perpendicular magnetizable thin films of rare earth element-transition metal among the above-mentioned materials. Magneto-optical recording media having such amorphous perpendicular magnetizable thin films of rare earth element-transition metal, however, have a storage problem. If the magnetic thin film layers are stored in contact with the ambient atmosphere, rare earth elements therein are preferentially erroded or oxidized by oxygen and moisture in the atmosphere, losing the necessary information recording and reproducing ability.

The optical recording medium is also required to have as large a rotational angle upon recording and reproducing operation as possible in order to improve recording/reproducing performance and C/N (carrier-to-noise) ratio. A high reflectance of at least 20% is necessary to obtain a stable servo signal.

For this reason, most recording media are of the structure having an intermadiate layer formed between the substrate and the magnetic thin film layer or a protective layer on the magnetic thin film layer.

Intermediate layers for imparting corrosion resistance or moisture proofness and for adding multiple interference effect or Farady effect to Kerr effect to increase the rotational angle are disclosed in, for example, Japanese Patent Application Kokai No. 58-80142 as vacuum deposited films of inorganic materials such as silicon monoxide, silicon dioxide, aluminum nitride, silicon nitride and zinc sulfide. However, these layers are insufficient in corrosion resistance and other respects.

It is also known from Japanese Patent Application Kokai No. 60-145525 to form an intermediate layer from a mixture of oxide and nitride, more particularly a mixture of Si$_3$N$_4$ and SiO$_2$ and a mixture of AlN and Al$_2$O$_3$. However, these layers are insufficient in C/N ratio, corrosion resistance and other respects.

We have proposed in Japanese Patent Application No. 61-370300 an intermediate layer which contains nitrides and oxides of at least two of metals and metalloids, for example, a mixture of Si, Al, N and O. However, these layers are insufficient in C/N ratio, corrosion resistance and other respects.

Japanese Patent Application Kokai No. 61-22458 discloses an intermediate layer which predominantly comprises silicon nitride and contains an additive ingredient such that the intermediate layer may have a refractive index of at least 2.1. A typical composition of the intermediate layer disclosed therein is Si$_3$N$_4$ 90 mol %-Al$_2$O$_3$ 6 mol %-Y$_2$O$_3$ 4 mol %, which has a Y content of 1.4 atom % and a (Si+N) content of 92.6 atom %.

Japanese Patent Application Kokai No. 61-278062 discloses an intermediate layer which is formed by sputtering a target containing silicon nitride, aluminum oxide, and yttrium oxide. The intermediate layer is disclosed therein as consisting of 0.1–5 mol % of Al$_2$O$_3$, 0.1–3 mol % of Y$_2$O$_3$, and 92–99.8 mol % of Si$_3$N$_4$, which has a Y content of up to 0.9 atom % and a (Si+N) content of at least 94.2 atom %.

These intermediate layers have a too low reflectance to provide a stable servo signal.

These problems also occur in optical recording media having a recording layer of the so-called phase conversion type.

SUMMARY OF THE INVENTION

An object of the present invention is to provide a novel and improved optical recording medium having sufficient reflectance and corrosion resistance while maintaining satisfactory recording/reproducing performance and C/N ratio.

The present invention is directed to an optical recording medium comprising a substrate, a recording layer on the substrate, and an intermediate layer between the substrate and the recording layer.

According to a first aspect of the present invention, the intermediate layer has a composition comprising silicon, aluminum, oxygen, nitrogen, and at least one rare earth element selected from the group consisting of yttrium, lanthanide elements and actinide elements, and containing 2 to 35 atom % of the rare earth element and 20 to 95 atom % of silicon and nitrogen in total.

According to a second aspect of the present invention, the intermediate layer has a composition comprising silicon, aluminum, oxygen, nitrogen, and at least one rare earth element selected from the group consisting of yttrium, lanthanide elements and actinide elements, and containing 0.1 to 2 atom % of the rare earth element and 20 to 90 atom % of silicon and nitrogen in total.

BRIEF DESCRIPTION OF THE DRAWING

The above and other objects, features, and advantages of the present invention will be more readily understood from the following description when taken in conjunction with the accompanying drawing, in which:

the only figure, FIG. 1 is a cross-sectional view of an optical recording medium according to one preferred embodiment of the present invention.

DETAILED DESCRIPTION OF THE INVENTION

One preferred embodiment of the optical recording medium of the present invention is illustrated in FIG. 1.

The optical recording medium according to the present invention is generally designated at 1 as comprising a substrate 2 having a pair of opposed major surfaces, a first protective layer 31 on one substrate major surface, an intermediate layer 4 on the first protective layer, a recording layer in the form of a magnetizable thin-film layer 5 on the intermediate layer 4, and a second protective layer 35 on the surface of the recording layer 5 that is remote from the substrate 2.

The intermediate layer according to the present invention contains silicon, aluminum, oxygen, nitrogen, and at least one rare earth element selected from the group consisting of yttrium, lanthanide elements and actinide elements.

Inclusion of these essential elements in the intermediate layer ensures an optical recording medium having high C/N ratio and corrosion resistance. Since the light transmittance of the intermediate layer is increased, the reflectance is so improved that there is available a sufficient servo signal to carry out stable servo operation. Even if one of these elements is absent, the present invention is ineffective.

Briefly stated, the intermediate layer contains 0.1 to 35 atom % of the rare earth element. The combined amount of silicon and nitrogen in the intermediate layer ranges from 20 to 95 atom % when the content of rare earth element is from 2 to 35 atom % and from 20 to 90 atom % when the content of rare earth element is from 0.1 to 2 atom %. The content of silicon and nitrogen more preferably ranges from 20 to 84 atom %, most preferably from 20 to 65 atom %.

According to the first aspect of the present invention, the intermediate layer contains 2 to 35 atom % of the rare earth element and 20 to 95 atom % of silicon and nitrogen combined.

In the intermediate layer, the sum of silicon and nitrogen, (Si+N) ranges from 20 to 95 atom % preferably from 20 to 84 atom %. The intermediate layer is less corrosion resistant when the sum of Si+N is less than 20 atom %. An intermediate layer containing more than 95 atom % of Si+N has a too low reflectance to provide a servo signal, which is disadvantageous for drive design. Light transmittance is best improved with the sum of Si+N in the range of from 20 to 65 atom %.

The content of aluminum preferably ranges from 1 to 20 atom %, more preferably from 2 to 10 atom % because there is obtained an intermediate layer which is stable, dense and corrosion resistant.

The content of silicon preferably ranges from 5 to 45 atom %, more preferably from 5 to 38 atom %.

Silicon and aluminum are generally present in the form of oxide and nitride in the intermediate layer and form an amorphous material. These compounds may more or less deviate from their stoichiometric composition.

The intermediate layer contains 2 to 35 atom % of at least one rare earth element selected from the group consisting of yttrium, lanthanide elements and actinide elements. Among these rare earth elements, yttrium and lanthanide elements are preferred. The presence of rare earth element improves the recording sensitivity and C/N ratio of the medium.

Better results are obtained when the intermediate layer contains at least one rare earth element selected from the group consisting of yttrium (Y), lanthanum (La), cerium (Ce), praseodymium (Pr), neodium (Nd), samarium (Sm), and europium (Eu). Not only recording/reproducing performance including recording sensitivity and C/N, but also durability and corrosion resistance are improved with these rare earth elements.

The rare earth element is contained as a mixture with the amorphous material in the intermediate layer and may be present in either an elemental form or a compound form. When the rare earth element is contained as a compound, it preferably takes the form of oxide.

The rare earth element is preferably present in an amount of from 2 to 35 atom %, more preferably from 6 to 35 atom % based on the total amount of the intermediate layer. More than 35 atom % of rare earth element will adversely affect corrosion resistance.

An elemental analysis of Si, Al, Y, lanthanide, actinide, O, N and other elements may be carried out by suitable spectroscopy including Auger, SIMS, ESCA, and LAMMA.

The intermediate layer may be formed by any desired one of gas phase film-forming techniques including sputtering, evaporation, ion plating, plasma chemical vapor deposition (plasma CVD), and light CVD. Sputtering is particularly preferred. Preferred sputtering techniques include sputtering using a target of a composition corresponding to the composition of an intermediate layer to be formed, multiple source sputtering using two or more targets of different compositions, and reactive sputtering using oxygen and nitrogen. Particularly preferred is a multiple sputtering technique using a target of an amorphous material and another target of a rare earth element.

The thickness of the intermediate layer preferably ranges from 30 to 300 nm, more preferably from 50 to 200 nm. Better results are obtained with respect to enhancement effect when the intermediate layer is set to a thickness of $\lambda/4n$ wherein $\lambda$ is the wavelength of laser light used and n is the refractive index of the intermediate layer.

The intermediate layer may contain some impurities. For example, it is permissible that argon is introduced from the film-forming atmosphere. Other impurities will be introduced from the source materials. For example, $Fe_2O_3$, CuO, $Cr_2O_3$, $MnO_x$, CoO, NiO, and $As_2O_3$ may be contained in an amount of less than 1.0% by weight based on the total weight of the intermediate layer composition.

According to the second aspect of the present invention, the intermediate layer contains 0.1 to 2 atom % of the rare earth element and 20 to 90 atom % of silicon and nitrogen combined.

In the intermediate layer, the sum of silicon and nitrogen, (Si+N) ranges from 20 to 90 atom %, preferably from 20 to 84 atom %. The intermediate layer has a too low refractive index to provide enhancement effect when the sum of Si+N is less than 20 atom %. An intermediate layer containing more than 90 atom % of Si+N has some problems that it has a high stress involved so that pinholes will occur in the intermediate layer as the apparatus for the formation of an intermediate layer is repeatedly operated with a vacuum tank which is contaminated with dust, and that it has a too low light transmittance and hence, affords a too low reflectance to provide a servo signal for stable servo control. Light transmittance is best improved with the sum of Si+N in the range of from 20 to 65 atom %.

The content of aluminum preferably ranges from 3 to 33 atom %, more preferably from 3 to 25 atom % because there is obtained an intermediate layer which is stable, dense and corrosion resistant.

The content of silicon preferably ranges from 8 to 40 atom %, more preferably from 8 to 36 atom %.

Silicon and aluminum are generally present in the form of oxide and nitride in the intermediate layer and form an amorphous material. These compounds may more or less deviate from their stoichiometric composition.

Refractive index can be increased to improve recording sensitivity at no sacrifice of reflectance by introducing into the intermediate layer up to 2 atom % of at least one rare earth element selected from the group consisting of yttrium, lanthanide elements and actinide elements. Among these rare earth elements, yttrium and lanthanide elements are preferred. The presence of rare earth element improves the recording sensitivity and C/N ratio of the medium.

Better results are obtained when the intermediate layer contains at least one rare earth element selected from the group consisting of yttrium (Y), lanthanum (La), cerium (Ce), praseodymium (Pr), neodium (Nd), promethium (Pm), samarium (Sm), and europium (Eu). Not only recording/reproducing performance including recording sensitivity and C/N, but also durability and corrosion resistance are improved with these rare earth elements.

The rare earth element is contained as a mixture with the amorphous material in the intermediate layer and may be present in either an elemental form or a compound form. When the rare earth element is contained as a compound, it preferably takes the form of oxide.

The rare earth element is preferably present in an amount of from 0.1 to less than 2 atom %, more preferably from 0.2 to 1.9 atom % based on the total amount of the intermediate layer. Less than 0.1 atom % of rare earth element is ineffective.

Inclusion of rare earth element has a secondary advantage. A sintered target is usually prepared for the formation of an intermediate layer by sputtering. Inclusion of rare earth element enables formation of a dense compact target, which promises efficient sputtering because of increased cooling efficiency and reduced radiant heat.

The remaining features of the intermediate-layer according to the second aspect are the same as those according to the first aspect, including preparation method, thickness, and impurities.

The magnetic thin-film layer 5 is a recording layer in which signals indicative of information are magnetically recorded using a modulated thermal beam or modulated magnetic field and the recorded signals are reproduced through magnetic-to-optical signal conversion.

The magnetic thin-film layer is generally formed from alloys containing rare earth elements and transition metals by conventional techniques such as sputtering and vacuum deposition to produce an amorphous film to an ordinary thickness. The rare earth elements and transition metals used include all the members of their chemically defined classes. The preferred rare earth elements are gadolinium (Gd) and terbium (Tb), and the preferred transition metals are iron (Fe) and cobalt (Co). The magnetic thin-film layer is preferably comprised of 65 to 85 atom percents of Fe and Co in total and the balance essentially of rare earth metals, especially Gd and/or Tb. Preferred combinations are TbFeCo, GdFeCo, GdTbFeCo, etc. Recording sensitivity is further improved by partially replacing Gd and/or Tb by up to 50 atom % of at least one member of Sm, Nd, Dy, En, Pr, Ce, and Ho. The magnetic thin-film layer may contain less than about 10 atom % of Cr, Al, Ti, Pt, Si, Mo, Mn, V, Ni, Cu, Zn, Ge, Au, etc. The magnetic thin-film layer may also contain less than about 10 atom % of an additional rare earth element such as Sc, Y, La, Ce, Pr, Nd, Pm, Sm, Eu, Dy, Ho, Er, Tm, Yb, Lu, etc.

The magnetic thin-film layers are preferably about 10 to about 1,000 nm thick.

The material of which the recording layer is made also includes materials of phase conversion type, for example, Te-Se, Te-Se-Sn, Te-Ge, Te-Tn, Te-Sn, Te-Ge-Sb-S, Te-Ge-As-Si, Te-Si, Te-Ge-Si-Sb, Te-Ge-Bi, Te-Ge-In-Ga, Te-Si-Bi-Tl, Te-Ge-Bi-In-S, Te-As-Ge-Sb, Te-Ge-Se-S, Te-Ge-Se, Te-As-Ge-Ga, Te-Ge-S-In, Se-Ge-Tl, Se-Te-As, Se-Ge-Tl-Sb, Se-Ge-Bi, Se-S (see Japanese Patent Publication No. 54-41902 and Japanese Patent No. 1004835), $TeO_x$ (Te dispersed in tellurium oxide as described in Japanese Patent Application Kokai No. 58-54338 and Japanese Patent No. 974257), $TeO_x + PbO_x$ (see Japanese Patent No. 974258), $TeO_x + VO_x$ (see Japanese Patent No. 974257), chalcogens, for example, Te and Se base materials such as Te-Tl, Te-Tl-Si, Se-Zn-Sb, Te-Se-Ga, and $TeN_x$, alloys capable of amorphous-crystal transformation such as Ge-Sn and Si-Sn, alloys capable of color change through crystal structure transformation such as Ag-Zn, Ag-Al-Cu, and Cu-Al, and alloys capable of grain size change such as In-Sb.

The recording layer may be formed by any desired dry coating technique including evaporation, sputtering, and ion plating. The recording layer generally has a thickness of from about 20 nm to about 1 µm.

The substrate 2 for use in the optical recording medium according to the present invention is generally formed of glass or a resinous material. Typical resins include acrylic resins, polycarbonate resins, epoxy resins, and olefinic resins such as polymethylpentene. Preferred among these resins are polycarbonate resins because of their durability, especially resistance to warpage.

The polycarbonate resins used herein may be aliphatic polycarbonates, aromatic-aliphatic polycarbonates and aromatic polycarbonates, with the aromatic polycarbonates being particularly preferred. Polycarbonates derived from bisphenols are preferred because of melting point crystallinity and ease of handling. The most preferred is a bisphenol-A polycarbonate. The polycarbonate resin preferably has a number average molecular weight of from about 10,000 to 15,000.

The substrate 2 preferably has a refractive index of from about 1.55 to 1.59 at a wavelength of 830 nm. Since recording is generally carried out through the substrate, the transmittance of recording or reading-out light is preferably 86% or higher.

In general, the substrate is of disk shape although it may have another shape such as tape and drum.

The surface of such a disk-shaped substrate on which the magnetic thin-film layer is formed may be provided with a tracking channel. The channel has a depth of about $\lambda/8n$, especially from $\lambda/6n$ to $\lambda/12n$ wherein n is the refractive index of the substrate. The channel has a width of about 0.4 to 2.0 µm. The substrate may also be formed with a pit for addressing purpose.

Those portions of the magnetic thin-film layer which are located on the bottom of the channels constitute recording tracks where writing and reading light beams are preferably directed from the lower surface of the substrate. With this construction, the reading C/N ratio is improved and a control signal of a greater magnitude is available for tracking.

The optical recording medium of the present invention may have the first protective layer 31 on the substrate 2 and the second protective layer 35 on the surface of the magnetic thin-film layer 5 that is remote from the substrate 2. The protective layer is effective in improving the durability and corrosion resistance of the medium.

The protective layers may be formed from any desired composition, for example, compounds containing oxygen, carbon, nitrogen and sulfur, for example, various dielectric materials such as $SiO_2$, SiO, AlN, $Al_2O_3$, $Si_3N_4$, ZnS, BN, $TiO_2$, TiN and mixtures thereof, and glass such as borosilicate glass, barium borosilicate glass, aluminum borosilicate glass or a mixture thereof with $Si_3N_4$. Preferred are borosilicate glass, barium borosilicate glass, and aluminum borosilicate glass containing 40 to 80% by weight of $SiO_2$, the $SiO_2$ being partially replaced by $Si_3N_4$ if desired.

The following vitreous compositions are particularly preferred:

(1) a composition comprising 40 to 60% by weight of silicon oxide, up to 50% by weight of a divalent metal oxide such as BaO, CaO, SrO, MgO, ZnO and PbO and/or up to 10% by weight of an alkali metal oxide, and boron oxide and/or aluminum oxide.

(2) a composition comprising Si and additional metals or metalloids which are at least one member of Ba, Ca, Sr, Mg, Zn, and Pb, at least one member of Al and B, and at least one alkali metal, wherein the atomic ratio of Si to the total of metals and metalloids ranges from 3/10 to 9/10, the composition further containing oxygen and nitrogen in a ratio O/(O+N) of from 4/10 to 8/10.

These preferred compositions of which the protective layer is made are disclosed in Japanese Patent Application Nos. 61-300859, 61-302275, 61-303224, 61-307300, 61-313614, 61-313615, 61-313720, 61-314948, and 61-314949. With these compositions, durability and corrosion resistance are enhanced.

The protective layer may be formed by the same or similar method as used in the formation of the intermediate layer. The protective layer preferably has a thickness of from about 30 to about 300 nm, more preferably from about 50 to about 200 nm.

The optical recording medium 1 of the present invention may further include an organic protective coating layer 6 on the second protective layer 35 which is formed on the surface of the magnetic thin-film layer 5 remote from the substrate 2 as shown in FIG. 1.

The material of which the organic protective coating layer 6 is formed includes a variety of well-known organic materials. Preferably the organic protective coating layer 6 is a coating of a radiation-curable compound cured with radiation such as electron radiation and ultraviolet radiation.

Illustrative radiation-curable compounds include monomers, oligomers and polymers having contained or incorporated in their molecule groups capable of crosslinking or polymerizing upon exposure to radiation, for example, acrylic double bonds as given by acrylic and methacrylic acids having an unsaturated double bond capable of radical polymerization in response to an ionization energy and esters thereof, allyl double bonds as given by diallyl phthalate, and unsaturated bonds as given by maleic acid and maleic derivatives. The radiation-curable monomers used herein are those compounds having a molecular weight of less than 2,000 and the oligomers are those compounds having a molecular weight of 2,000 to 10,000.

The radiation-curable compounds having unsaturated double bonds which may be used as oligomers and monomers in the present invention include styrene, ethylacrylate, ethylene glycol diacrylate, ethylene glycol dimethacrylate, diethylene glycol diacrylate, diethylene glycol methacrylate, 1,6-hexaneglycol diacrylate, and 1,6-hexaneglycol dimethacrylate. More preferred are pentaerythritol tetraacrylate (and methacrylate), pentaerythritol triacrylate (and methacrylate), trimethylolpropane triacrylate (and methacrylate), trimethylolpropane diacylate (and methacrylate), polyfunctional oligoester acrylates (e.g., Aronix M-7100, M-8060, M-5400, M-5500, M-5700, M-6250, M-6500, M-8030, M-8100, etc., available from Toa Synthetic K.K.), acryl modified products of urethane elastomers (e.g., Nippolane 4040 available from Nippon Polyurethane K.K.), and the derivatives thereof having a functional group such as COOH incorporated therein, acrylates and methacrylates of phenol ethylene oxide adducts, compounds having a pentaerythritol fused ring represented by the following general formula and having an acryl or methacryl group or epsilon-caprolactone-acryl group attached thereto:

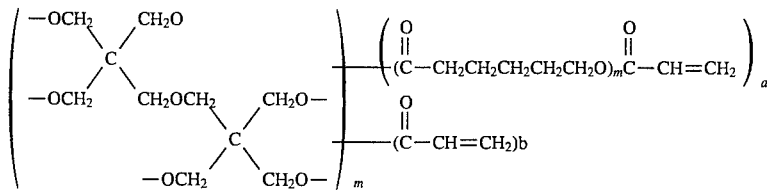

for example, compound wherein m=1, a=2, and b=4 (to be referred to as special pentaerythritol condensate A, hereinafter), compound wherein m=1, a=3, and b=3 (to be referred to as special pentaerythritol condensate B, hereinafter), compound wherein m=1, a=6, and b=0 (to be referred to as special pentaerythritol condensate C, hereinafter), and compound wherein m=2, a=6, and b=0 (to be referred to as special pentaerythritol condensate D, hereinafter), and special acrylates represented by the following general formulae:

1) $(CH_2=CHCOOCH_2)_3-CCH_2OH$ (Special acrylate A)

2) $(CH_2=CHCOOCH_2)_3-CCH_2CH_3$ (Special acrylate B)

3) $(CH_2=CHCO(OC_3H_6)_n-OCH_2)_3-CCH_2CH_3$ (Special acrylate C)

4) $CH_2=CHCO(OC_2H_4)_2-O-\phi-SO_2-\phi-O-(OC_2H_4)_2OCCH=CH_2$ (Special acrylate D)

5) 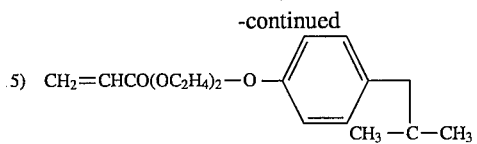

(Special acrylate E)

6) 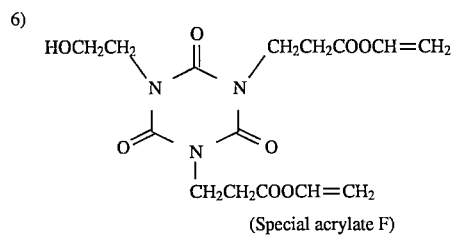

(Special acrylate F)

7) 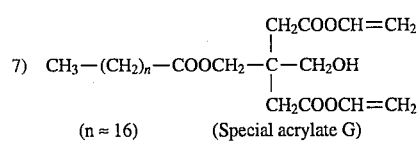

(n ≈ 16)     (Special acrylate G)

8) 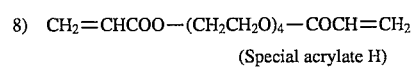

(Special acrylate H)

9) 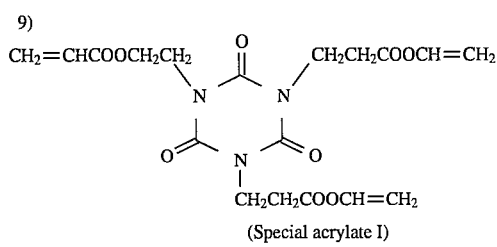

(Special acrylate I)

10) 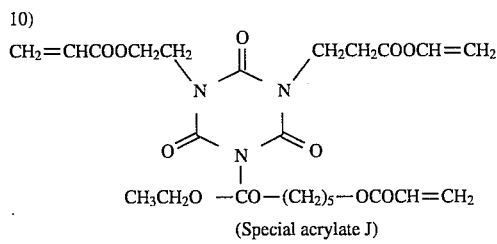

(Special acrylate J)

11) 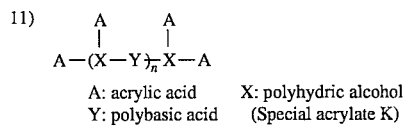

A: acrylic acid    X: polyhydric alcohol
Y: polybasic acid    (Special acrylate K)

12) 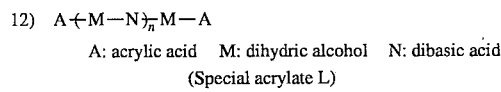

A: acrylic acid   M: dihydric alcohol   N: dibasic acid (Special acrylate L)

The radiation-curable oligomers include polyfunctional oligo-ester acrylates as represented by the following general formula:

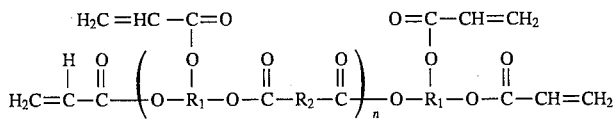

wherein $R_1$ and $R_2$ are alkyl and n is an integer, and acryl-modified urethane elastomers, and derivatives thereof having such a functional group as COOH incorporated therein.

Also employable are radiation-curable resins which are prepared by modifying thermoplastic resins to be radiation sensitive.

Illustrative radiation-curable resins are thermoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives.

The thermoplastic resins which can be modified into radiation-curable resins include vinyl chloride copolymers, saturated polyester resins, polyvinyl alcohol resins, epoxy resins, phenoxy resins, cellulosic derivatives, etc.

Other examples of the resins which can be modified to be radiation curable include polyfunctional polyester resins, polyether ester resins, polyvinyl pyrrolidone resins and derivatives (e.g., PVP-olefin copolymers), polyamide resins, polyimide resins, phenol resins, spiroacetal resins, and acrylic resins comprising as a polymerization component at least one acryl or methacryl ester having a hydroxyl group.

The organic protective coating layer of radiation-cured compound has a thickness of about 0.1 to 30 μm, preferably about 1 to 10 μm. Films of less than 0.1 μm thick are difficult to produce as a uniform film, less moisture proof in a highly humid atmosphere, and thus insufficient to improve the durability of the magnetic thin-film layer. Films in excess of 30 μm thick are practically unacceptable because their shrinkage during curing causes the recording medium to be warped and cracks to occur in the organic protective layer.

The organic protective layer may be formed by coating an appropriate composition by any well-known coating methods such as spin coating, gravure coating, spray coating, and dipping. The conditions under which the film is coated may be suitably chosen by taking into account the viscosity of the polymer component in the composition, the substrate surface state, and the intended coating thickness.

These radiation-curable resins may be cured by any of various well-known methods using electron or ultraviolet radiation.

For electron radiation curing, a radiation accelerator is preferably operated at an accelerating voltage of 100 to 750 kV, more preferably 150 to 300 kV to generate radiation having a sufficient penetrating power such that the object is exposed to a radiation dose of 0.5 to 20 megarad.

When curing is effected with ultraviolet radiation, a photo polymerization sensitizer may be added to the radiation curable compounds as mentioned above.

The photo polymerization sensitizers used herein may be selected from well-known sensitizers. Examples of such sensitizers include benzoins such as benzoin methyl ether, benzoin ethyl ether, α-methylbenzoin, α-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

A coating containing a radiation-curable compound and a photo polymerization sensitizer may be cured with ultraviolet light by any desired well-known methods. For exposure to ultraviolet radiation there may be used UV lamps such as xenon discharge lamps and hydrogen discharge lamps.

The optical recording medium 1 of the present invention may further include a protective plate 8 disposed on the organic protective coating layer 6 through an adhesive layer 7 as shown in FIG. 1. More particularly, the protective plate 8 is used when the medium is of single side recording type wherein recording and reproducing operations are carried out only from the lower surface of the substrate 2 which is free of a magnetic thin-film layer.

The protective plate 8 may be of a resinous material. Since the resinous material of the protective plate need not be transparent, a variety of resins may be used, for example, thermoplastic resins such as polyethylene, polyvinyl chloride, polystyrene, polypropylene, polyvinyl alcohol, methacrylic resin, polyamide, polyvinylidene chloride, polycarbonate, polyacetal, and fluoro resin; and thermosetting resins such as phenol resin, urea resin, unsaturated polyester resin, polyurethane, alkyd resin, melamine resin, epoxy resin, and silicone resin.

It is also possible to form the protective plate 8 from an inorganic material such as glass and ceramics. The shape and dimensions of the protective plate 8 are approximately the same as the substrate 2.

The protective plate 8 is bonded to the organic protective coating layer 6 through the adhesive layer 7. The adhesive layer 7 may be of a hot-melt resin adhesive and has a thickness of about 1 to about 100 μm.

Instead of the protective plate 8, two sets of substrate 2, intermediate layer 4, magnetic thin-film layer 5, protective layer 31/35, and organic protective coating layer 6 may be prepared and bonded with an adhesive layer such that the magnetic thin-film layers may be opposed to each other. This results in a double sided recording type medium wherein recording and reproducing operations can be carried out from the lower surfaces of both the substrates.

The lower surface of the substrate 2 and the top surface of the protective plate 8 which is remote from the magnetic thin-film layer 5 are preferably covered with suitable protective coatings. Such coatings may be formed from the same material as previously described for the organic protective coating layer 6.

The optical recording medium of the present invention having an intermediate layer of a specific composition is satisfactorily durable and resistant to corrosion. Recording/reproducing performance including recording sensitivity and C/N is maintained excellent. A stable servo signal is available from a high reflectance. Since only a less stress is induced in the intermediate layer, there is little likelihood of the substrate warping. The drawback that pinholes would otherwise occur in the intermediate layer during its formation as the apparatus for its formation is repeatedly operated is eliminated.

EXAMPLES

In order that those skilled in the art will better understand the practice of the present invention, examples of the present invention are given below by way of illustration and not by way of limitation.

EXAMPLE 1

An optical recording disk having a structure as shown in FIG. 1 was prepared by molding a disk-shaped substrate from a bisphenol-A polycarbonate of optical disk grade to a diameter of 13 cm and a thickness of 1.2 mm. A first protective layer was formed on the substrate by RF magnetron sputtering vitreous material to a thickness of 80 nm. The protective layer had a composition consisting of 48% by weight of $SiO_2$, 15% by weight of $Al_2O_3$, 14% by weight of $B_2O_3$, 3% by weight of $Ba_2O$, 2% by weight of $K_2O$, 5% by weight of BaO, 9% by weight of CaO and 4% by weight of MgO.

An intermediate layer having the composition reported in Table 1 was formed on the protective layer by sputtering or multiple source sputtering. The layer was formed to an optimum thickness for enhancement effect as calculated from $\lambda/4n$, that is, 80 to 150 nm in this example. The composition of the layer was analyzed by Auger spectroscopy. In Table 1, R designates a rare earth element.

A magnetic thin-film layer of Tb 25 at %-Fe 63 at %-Co 7 at %-Ti 5 at % alloy was formed on the intermediate layer by sputtering to a thickness of 80 nm. The target used in sputtering was an iron (Fe) target having Tb, Co and Ti chips rested thereon.

A second protective layer having the same composition as the first protective layer was formed on the magnetic thin-film layer in the same manner.

The second protective layer was coated with a radiation-curable coating composition by spin coating to form an organic protective coating layer. The coating composition contained 100 parts by weight of a multi-functional oligoester acrylate and 5 parts by weight of a light sensitizer. The coating of the composition was exposed to UV for 15 seconds into a cured film.

In this way, a series of optical recording medium samples were prepared as shown in Table 1. They were measured for the following properties.

(1) Reflectance

The reflectance of a sample at its flat portion was measured by a spectrophotometer by applying a semi-conductor laser beam having a wavelength of 830 nm.

(2) Corrosion resistance (C.R.)

A high-temperature, high-humidity aging test was carried out. That is, a sample was stored at 80° C. and 80% RH. This accelerated test was continued until the burst error reached twice the initial. The corrosion resistance of the sample is expressed by the duration of the test continued. Under the conditions, occurrence of pinholes largely contributed to an increase of burst error.

(3) C/N

The C/N (carrier-to-noise ratio) of a sample expressed in dB was measured under the following conditions.

Rotating speed: 4 m/sec.

Carrier frequency: 1.0 MHz

Resolution: 30 KHz

Video band width: 100 Hz

Recording power: 3–6 mW at 830 nm

Reproducing power: 1 mW at 830 nm

The results are shown in Table 1.

TABLE 1

| Sample No. | Composition (at %) | | | | | | Reflectance (%) | C.R. (hour) | C/N (dB) |
|---|---|---|---|---|---|---|---|---|---|
| | Si | Al | O | N | R | | | | |
| 101 | 28 | 4 | 19 | 37 | La | 12 | 25 | >750 | 53 |
| 102 | 24 | 4 | 24 | 32 | La | 16 | 27 | >750 | 53 |
| 103 | 32 | 2 | 14 | 44 | La | 8 | 23 | >750 | 53 |
| 104 | 39 | 3 | 6 | 48 | La | 4 | 21 | >750 | 53 |
| 105 | 28 | 4 | 19 | 37 | Y | 12 | 26 | >750 | 53 |
| 106 | 28 | 4 | 19 | 37 | Th | 12 | 25 | >750 | 53 |
| 107 | 20 | 1 | 37 | 24 | Y + Sm | 18 | 28 | >750 | 53 |
| 109* | 36 | 8 | 13 | 43 | — | — | 19 | >750 | 51 |
| 110* | 4 | 1 | 53 | 5 | Y | 37 | 29 | <700 | 51 |
| 111* | 40 | 4 | 4 | 51 | Y | 1 | 18 | >750 | 51 |

*outside the scope of the invention

EXAMPLE 2

The procedure of Example 1 was repeated. The results are shown in Table 2.

TABLE 2

| Sample No. | Composition (at %) | | | | | | Si + N | Reflectance (%) | C.R. (hour) | C/N (dB) |
|---|---|---|---|---|---|---|---|---|---|---|
| | Si | Al | O | N | R | | | | | |
| 201 | 23 | 17 | 28 | 31 | Y | 1 | 54 | 23 | >750 | >53 |
| 202 | 21 | 21 | 29 | 28 | Y | 1 | 49 | 23 | >750 | >53 |
| 203 | 30 | 12 | 18 | 39 | Y | 1 | 69 | 22 | >750 | >53 |
| 204 | 38 | 6 | 8 | 50 | Y | 1 | 88 | 20 | >750 | >53 |
| 205 | 15 | 26 | 35 | 20 | La | 1 | 36 | 24 | >750 | >53 |
| 206 | 30 | 12 | 18 | 39 | Ce + Nd | 1 | 69 | 22 | >750 | >53 |
| 207* | 40 | 4 | 4 | 51 | Y | 1 | 91 | 18 | >750 | >51 |
| 208* | 6 | 34 | 51 | 8 | Y | 1 | 14 | 24 | <700 | 51 |
| 209* | 42 | — | 1 | 56 | Y | 1 | 99 | 18 | >750 | >53 |
| 210 | 23 | 16.5 | 28 | 31 | Y | 1.5 | 54 | 23 | >750 | >53 |
| 211 | 23 | 17.5 | 28 | 31 | Y | 0.5 | 54 | 23 | >750 | >53 |
| 212 | 23 | 17 | 28 | 31 | Y | 1 | 54 | 23 | >750 | >53 |
| 213 | 23 | 17 | 28 | 31 | Y | 1 | 54 | 23 | >750 | >53 |

*outside the scope of the invention

Sample No. 212 had a magnetic thin-film layer formed from an alloy consisting of 15 atom % of Tb, 10 atom % of Dy, 63 atom % of Fe, 7 atom % of Co and 5 atom % of Ti. Sample No. 213 had a magnetic thin-film layer formed from an alloy consisting of 17.5 atom % of Tb, 7.5 atom % of Nd, 63 atom % of Fe, 7 atom % of Co and 5 atom % of Ti. It was observed that sample Nos. 212 and 213 had superior recording sensitivity to the remaining samples.

Those samples having an intermediate layer which was free of a rare earth element had inferior recording sensitivity to the samples reported above.

The results of Examples 1 to 2 show the effectiveness of the present invention.

Similar results were obtained with phase conversion type recording, layers of Te-Ge, $TeO_x$, and Te-Se.

Obviously, numerous modifications and variations of the present invention are possible in light of the above teachings. It is therefore to be understood that within the scope of the appended claims, the invention may be practiced otherwise than as specifically described herein.

We claim:

1. An optical recording medium comprising a substrate, a recording layer on the substrate, and an intermediate layer between the substrate and the recording layer formed by sputtering, which comprises silicon, aluminum, oxygen, nitrogen, and 6 to 35 atom % of at least one element selected from the group consisting of Y, La, Cs, Pr, Nd, Sm, Eu and Th, wherein the silicon content is 5–38 atom %, the total amount of silicon plus nitrogen is 20 to 56 atom % and the Al content is 1 to 10 atom %.

2. The optical recording medium of claim 1 wherein the intermediate layer contains 6 to 35 atom % of at least one element selected from the group consisting of Y, La and Sm.

3. The optical recording medium of claim 1 wherein the intermediate layer contains 2 to 10 atom % of aluminum.

4. The optical recording medium of any one of claims 1, 2 and 3 which further comprises at least one protective layer between the substrate and the intermediate layer or on the recording layer.

5. The optical recording medium of claim 4 wherein the protective layer is of vitreous material.

6. The optical recording medium of any one of claims 1, 2 and 3 wherein the recording layer is a magnetic thin-film layer.

* * * * *

UNITED STATES PATENT AND TRADEMARK OFFICE
CERTIFICATE OF CORRECTION

PATENT NO. : 5,571,629

DATED : November 5, 1996

INVENTOR(S) : Hajime UTSUNOMIYA, et al.

It is certified that error appears in the above-identified patent and that said Letters Patent is hereby corrected as shown below:

Column 14, line 15, "Cs" should read –Ce–.

Signed and Sealed this

Sixteenth Day of December, 1997

Attest:

BRUCE LEHMAN

Attesting Officer    Commissioner of Patents and Trademarks